United States Patent

[11] 3,615,688

[72] Inventors Francis G. Connick
Downers Grove;
Warren R. Schack, Western Springs, both of Ill.

[21] Appl. No. 719,225
[22] Filed Apr. 5, 1968
[45] Patented Oct. 26, 1971
[73] Assignee Swift & Company
Chicago, Ill.

[54] METHOD OF MANUFACTURING A SHAPED WHOLE TISSUE HEAT-PROCESSED MEAT PRODUCT

3 Claims, No Drawings

[52] U.S. Cl. .......... 99/107, 99/187
[51] Int. Cl. .......... A22c 18/00, A23b 1/00
[50] Field of Search .......... 99/107, 130, 187, 194, 174

[56] References Cited

UNITED STATES PATENTS

| | | | |
|---|---|---|---|
| 3,076,713 | 2/1963 | Maas | 99/107 |
| 3,285,753 | 11/1966 | Schwall et al. | 99/107 |
| 3,011,895 | 12/1961 | Toepper et al. | 99/107 |
| 3,370,960 | 2/1968 | Jaccard | 99/107 |

FOREIGN PATENTS

| | | | |
|---|---|---|---|
| 559,664 | 7/1958 | Canada | 99/130 |

*Primary Examiner*—Hyman Lord
*Attorneys*—Edward T. McCabe, Charles E. Bouton and Jay C. Langston ABSTRACT: Various innovations and improvements are applied to segments of whole meat which are reformed and molded under predetermined conditions, packed into containers and heat processed. The resulting meat product is bound together in a composite mass conforming substantially to that of the interior of the container and possessing a third phase adhesive boundary line between the meat chunks that is substantially undetectable to the naked eye.

METHOD OF MANUFACTURING A SHAPED WHOLE TISSUE HEAT-PROCESSED MEAT PRODUCT

The present invention relates in general to the preparation of a composite meat product. More particularly, the invention pertains to improvements in the method of recombining variably shaped portions of either fresh or cured meat tissue so that the meat segments are in contiguous contact.

Conventional methods of making formed meat products usually involve a combination of techniques for handling the meat prior to cooking. The most common handling utilizes pressure for compacting the ground, highly subdivided muscle sectioned meat to remove voids and obtain firm binding after cooking. The most efficient method of handling includes the steps of grinding and mixing with the addition of emulsion and then the application of pressure during cooking. This technology has been used for many years in the manufacture of canned, comminuted luncheon meat, meat loaf, chopped pork, ham, etc.

Turning now to the techniques used to recombine large chunks of meat, one method employs the use of phosphates. These various forms of phosphates have been incorporated into meat such as ham, bacon, beef and poultry for improving the water-binding capacity of the protein. The addition of sodium chloride and phosphate to the meat surfaces solubilizes certain proteins (similar to emulsion in binding properties) which are heat coagulable to form cohesive bonds between the meat surfaces. Improvements of this binding or cementing of meat particles can be enhanced by increasing the surface area of meat particles to be bonded so that more soluble protein is available at the surface.

More recently, there has been an increased interest in the mechanical working of meat which increases the amount of soluble protein on the meat surface. This mechanical working can be carried to extremes so that the meat surfaces are so abraided that they are, in effect, emulsified and possess the appearance of finely chopped meat.

The results of the above techniques, i.e., the use of preformed emulsion, the working of the meat to form a tacky exudate of soluble proteins, or the addition of phosphates to extract soluble proteins, leave much to be desired. The recombined meat mass is not always continuous and may contain voids, cavities or jelled packets between the individual meat pieces. Almost always, there is present a thin, but noticeable layer of emulsion of soluble proteins which is highly undesirable from an aesthetic point of view.

In order to eliminate this unsightly emulsion, one can combine meat segments that have not been treated with preformed emulsion, coated with phosphates or worked to form emulsion films on the surfaces by placing them into a container, forming under pressure and heating to bind the pieces together. The degree to which the meat pieces are bound when using large chunks or segments of whole muscle tissue is extremely difficult to predict as the binding does not occur uniformly nor is the adhesive bond substantial.

Furthermore, in a typical commercial manufacturing procedure for cooked or heat-treated preformed meat products, there is considerable loss in water cookout which may amount to 10 percent to 30 percent of the original weight of the meat. Gelatin, wheat gluten, or other materials are sometimes used in the formulation in an effort to hold in the water and other meat juices. These imbibing agents leave much to be desired. For example, while wheat gluten has good powers of adhesion to meat, it contains heat-coagulable proteins but is unsightly in cured meat. This cooked gluten is productive of a tissuelike adhesive substance which simulates the connective tissue of meat. When used to bind pieces of meat, the seams can be clearly discernible to the naked eye.

Further, gelatin is a protein possessing binding properties in solution when cold. However, upon the application of heat, the gelatin melts, losing its adhesive properties. A meat product prepared by binding together chunks thereof only with gelatin will fall apart when heated.

In one recently issued patent relating to the preparation of shaped poultry products made up of a plurality of smaller pieces of poultry meat, there is the teaching of adding a batter or paste of ground-up poultry skin (which possesses a high concentration of desirable flavors and aroma factors) and small scraps of poultry meat to the plurality of meat pieces so as to add the flavor and aroma components to the resulting poultry roast or roll. The poultry skin, of course, contains collagen which upon cooking breaks down to gelatin having very low gel strength properties. By carefully grinding the poultry skin with small scraps of raw poultry meat to form a paste or batter, and applying the paste to the pieces of poultry meat in a particular critical sequence of steps, the antibinding characteristics of the skin are overcome. This is not to say that the gelatin resulting from collagen breakdown aids in the binding, but merely that the antibinding characteristics of the skin will not impair the properties of formed poultry products. Further, in such a product, the paste or batter forms a distinct third phase which is clearly discernible to the naked eye.

It is, therefore, an object of this invention to provide an improved meat product formed of chunks of meat secured together by a third phase which is substantially undetectable to the naked eye, thereby forming an attractive product.

Another object of this invention is to provide a formed meat product having an increased out-of-can yield (about 95 percent to 99 percent for pasteurized cured hams containing phosphate).

It is also an object of this invention to produce a formed meat product having such good adhesion between the chunks of meat that the surface bonds will substantially hold together even though sliced while hot.

Additional objects and advantages will become apparent to one skilled in the art from the following detailed description of the invention.

In general, the process of this invention comprises taking chunks or segments of meat greater than about one-quarter pound, usually between one-half to 10 pounds and quite often about 3 to 8 pounds, contacting the chunks with high Bloom strength gelatin, reforming and molding under compacting pressures, maintaining substantially the compacting pressure while the product is conveyed progressively into a restraining container and thermally processing the product, i.e., pasteurizing or sterilizing, whereupon the adjoining pieces of meat become bonded together in contiguous association such that the contents of each container form a single, composite, unitary meat body conforming to the shape of the interior of the restraining container.

By contiguous association is meant adjoining pieces or segments next to each other with substantially nothing intervening. While the contiguous meat segments are bound together at their interfaces, the adhesive boundary line between the meat segments or chunks is substantially undetectable to the naked eye. If it were not for the fact that the various meat segments are not of the exact same color or fiber alignment, the boundary line between the contiguous pieces would be undiscernible inasmuch as the boundary line is less than about 0.05 inches, probably about 0.01 to 0.03 inches in width.

More in detail, the invention is particularly useful in recombining segments of meat which may range from about one-quarter pound to 10 pounds or more, and preferably 3 to 6 pounds, and hence, is not applicable to ground, chopped or comminuted meat even of the course variety. The invention is applicable or useful in connection with various types of meat such as pork, beef, mutton, veal, lamb, venison and poultry. If cured meat chunks are to be used, the meat may be cured either while still in the form of primal cuts or it may be cured after the primal cuts have been suitable segmented. While one may remove excess fat, it should be noted that it is not necessary. The bonding is basically lean to lean as the fat has little or no binding property. However, the antibinding characteristics of the fat are overcome when carrying out the procedure of the invention and a composite, unitary product results without impairment of its favorable properties.

In carrying out the process of this invention, tempered meat having a temperature of between about 32° F. and about 45°

F., preferably 35° F. to 40° F., is treated with gelatin. The coated meat segments are reformed and compacted to about 90 percent to 95 percent of their original size. This is accomplished with minimal temperature change (less than 4° F.) and usually about 1° or 2° F.

Any method for incorporating the gelatin into or depositing it on the meat is suitable in the practice of the invention. It is preferred, however, to sprinkle or dust dry gelatin on to the cut surfaces of the meat. The amount of gelatin required will vary with the type of meat and whether it is fresh or cured, but generally speaking at least about 0.1 ounce of dry gelatin per 10 pounds of meat is utilized. Normally one should use about 0.25 ounces to about 2.0 ounces per 10 pounds of meat.

An alternative method of adding the gelatin is by spraying a wet solution of the gelatin on to the meat segments. Whether one uses wet gelatin, a slurry of gelatin and other binders or additives, etc., the amount of gelatin used to coat the meat is based on the above amounts required for dry gelatin. Generally speaking, a gelatin having a Bloom strength greater than 100 will produce a good product, however, a Bloom strength of 200 to 350 is preferred for superior products.

The coated meat segments can be mixed so as to coat as much of the surface area as is possible. Any tumbling, mixing or similar movement is needed only to uniformly distribute the gelatin over the surfaces of the meat and is not done to form tacky exudate or meat fiber emulsion on the surfaces. If a mixing step is desirable, it will generally range between about 1 to 12 minutes with a 2- to 5-minute interval being preferred. The desired result occurs when vacuum is used during mixing. As a general rule, it should be noted that the longer the meat is mixed, the poorer the product in relationship to its aesthetic appearance due to the formation of soluble protein-meat fiber emulsion on the surfaces of the meat segments, which in turn leads to visible binding seams in the final product.

After the meat chunks are adequately coated with the gelatin, they are subjected to reforming and compacting pressures of at least about 30 p.s.i.g. At this point, the gelatin starts to pick up moisture from the meat and begins to liquify. The pressure tends to liquify the gelatin and smear it across surfaces of the meat segments. The addition of the gelatin at or prior to the time the meat is subjected to compacting pressures critically enhances the binding quality and absorption of the meat juices as they are released during stuffing and subsequent thermal processing. Prior to the cooking or heat treatment, the gelatin is not fully hydrated and when the cooking does take place, the gelatin picks up the released meat juices and substantially reaches its full potential. This is very important inasmuch as the out-of-can yield is increased by about 5 percent to about 8 percent over that obtainable without gelatin and using any other prior art procedure.

Perhaps at this time it should be noted that some prior art procedures employ substantial pressures on the product during processing. Because of lack of uniformity of shape between the primal cuts or meat segments, the pressure applied is not uniformly distributed and consequently the restrained product seldom achieves complete surface to surface contact within the interior of the container. Almost always, some parts of the processed product do not bind together.

Further, in prior art techniques, the pressures exerted are only temporary and are not maintained throughout the conveying, filling or subsequent steps. On the other hand, the instant process contemplates molding the meat segments under forming or compacting pressures and maintaining substantially compacting pressures while the product is conveyed progressively into a restraining container. Subsequently, the product is cooked while restained and the adjoining pieces of meat become bonded together in contiguous association such that the contents of each container forms a single, unitary mass substantially conforming to the shape of the interior of the container.

During the molding step, the meat is reformed and compacted to about 90 percent to about 95 percent of its original volume. This compacting pressure will vary between 30 to 350 p.s.i.g. internal pressure. The compacting pressure is substantially maintained throughout the filling operation. This is generally accomplished by applying a retracting piston against the container being filled to maintain a line filling pressure from about 30 to about 300 p.s.i.g. depending upon the density and type of the meat being stuffed. The filled cans or other containers containing the compacted, restrained product are closed and heat processed such as by putting the same in hot water at 170° F. until the internal temperature of the meat reaches 150°–155° F. for a pasteurized product.

The following examples are set out for purposes of illustration only and are not to be construed as limiting the scope of the appending claims.

EXAMPLE I

Cured, defatted ham segments were subdivided into chunks weighing approximately 3 to 5 pounds apiece. The cut meat was then vacuum mixed for about 3 minutes with the addition of one ounce of dry gelatin (Bloom strength 300 per 10 pounds of meat. The coated meat chunks were then compacted by means of an auger feed in an Anco. Butcher Boy model AU 56, without the use of plate and/or cutting blades. The meat, while substantially under the compacting pressures, was fed volumetrically into the desired size outside supported container through a valve and stuffing horn by controlled synchronization of a retracting piston which maintained internal product pressures substantially at 300 p.s.i.g. while holding the restraining container against the stuffer horn and valve through which the meat was fed. The start and stop flow of the meat was controlled by an air-actuated cylinder operating a conventional, sanitary plug-type two-way valve. Presetting the stroke of the retracting piston predetermined the quantity delivered to be filled by tripping the air actuated cylinder operating the valve. Substantially constant pressure on the meat was maintained as it was being progressively conveyed through the filling operation. While the compacting, forming and molding of the meat chunks was taking place by means of conveyance through the auger, the fibers of the meat elongated creating new surfaces with minimal temperature change (4° F. or less). The gelatin, at this time, tended to liquify, find and absorb the meat juices as they were released during the stuffing and subsequent thermal processing. After subsequent thermal processing to 150°–155° F., the cans were opened and the out-of-can yield ranged between 95 percent to 98 percent. In all cases the products formed integral, solid blocks or loaves of meat which could be easily sliced and reheated without significant breaking or falling apart at the segment-segment bonds. The meat pieces were in contiguous association in that any boundary line between the meat pieces was substantially undetectable to the naked eye.

EXAMPLE II

Example I was repeated with the exception of a different cook. The product was thermal processed to $F_0$=0.25 in 400×400×602 cans. The out-of-can yields were 75 percent to 85 percent for the formed multisegmental product cans as compared to 65 percent to 75 percent for nonformed single segment chunk product cans.

EXAMPLE III

Fresh pork muscle tissue segments weighing between 3 and 6 pounds each and having 1/2 ounce of 250 Bloom gelatin based on 10 pounds of meat were weighed automatically. The meat was then fed volumetrically into the desired size can through a valve and stuffing horn by controlled synchronization of the retracting piston holding the empty can against the stuffer horn. Constant substantial compacting pressure was maintained on the meat as it was measured through for stuffing. The stuffing means consisted of a typical sausage stuffer with at least a 2-inch opening along its wide orifice thereby elongating the fibers and creating new surfaces with minimal temperature change, i.e., less than 2° F. The recombined meat product had an improved out-of-can yield of about 8 percent.

EXAMPLE IV

Cured, phosphate containing, defatted beef muscle tissue weighing about ½ to 3 pounds and having 2 oz./10 lbs. of meat of gelatin automatically distributed on the surface of the meat was transferred through a stuffer. The meat fibers were rubbed and pressed together as they discharged from the stuffer through an orifice of at least 2 inches i.d. along its wide diameter under constant pressure through a control measuring device into a container. This means crushed the surface of the meat and pressed the fibers together into tightly knitted muscle tissue having no unsightly binding lines. Temperature change was minimal and, in fact, was not of a measurable degree. Cooked yield of pasteurized product was 95 percent.

EXAMPLE V

Frozen turkey thigh meat was thawed to a temperature of 35° F. to 38° F. The meat was injecto cured to a 15 percent gain with a standard curing pickle containing tripolyphosphate, salt, sugar and sodium nitrite. Cured meat was held for 24 hours before further processing. The meat was then vacuum mixed with 2 oz. of 250 Bloom gelatin/cwt. of meat for 5 minutes. Mixed meat was stuffed with a Boss Stuffer into cans maintaining an internal compacting pressure on the meat during stuffing of 40 p.s.i.g. Cooked product was examined after removal of chilled meat from the can and the muscle pieces were bound together with the appearance of one large muscle.

EXAMPLE VI

Boneless veal was defatted to approximately a 95 to 5 ratio of lean meat to fat. One and one-half percent salt, tripolyphosphate and flavor ingredients with 1 oz. of high Bloom gelatin/cwt. meat were added to the meat as it was auger fed to a stuffing device (pump stuffer), while maintaining an internal compacting pressure of 150 p.s.i.g. on the meat. The meat was stuffed into cans and cooked to a minimum internal temperature of 150° F. The cooked chilled product was examined and had the appearance of one solid meat piece with no distinguishable lines of demarcation between the meat pieces.

EXAMPLE VII

This example is representative of product produced when the procedure of the invention is not carried out. Cured boneless hams, trimmed to remove fat and having a 95/5 trim, were augur fed into a stuffing and compacting device maintaining a compacting pressure of about 80 p.s.i.g. during stuffing into cans. The canned meat had gelatin added over the top of the surface and was cooked to a minimum internal temperature of 150° F. The cooked chilled product was examined for binding qualities and cross sections of the load had voids and jelly pockets with frequent lack of binding around the large particles. The product occasionally fell apart when sliced one-sixteenth inch to one-eighth inch in thickness. There was a lack of continuous meat or large muscle appearance throughout the cooked loaf.

Obviously many modifications and variations of the invention as heretofore set forth may be made without departing from the spirit and scope thereof, and, therefore, only such limitations should be imposed as are indicated in the appended claims.

We claim:

1. In the method of manufacturing a shaped, whole tissue, heat-processed meat product which can be sliced either hot or cold without falling apart, the steps comprising contacting meat chunks having a weight of at least about one-quarter pound each and a temperature of between about 32° F. and about 45° F. with gelatin in an amount of about 0.1 to about 2 ounces per 10 pounds of meat and having a Bloom strength of above 100, mixing said meat chunks and gelatin under vacuum for a period of about 1 to 12 minutes, conveying the meat while elongating the meat fibers to create new surfaces with minimal temperature changes, reforming and molding the meat chunks to about 90 percent to about 95 percent of their original size under compacting pressures of at least about 30 p.s.i.g., said compacting pressures tending to cause the gelatin to liquefy and be smeared across the surfaces of the meat chunks substantially maintaining the compacting pressures and vacuum while the product is conveyed progressively into a restraining container, and heat processing the contents of said container whereupon the adjoining pieces of meat become bonded together in contiguous association such that the contents of the container form a single, unitary meat body conforming to the shape of the interior of the container and the gelatin becomes fully hydrated picking up the released meat juices whereby the out of can yield is improved over that obtainable without the use of gelatin.

2. The process of claim 1 wherein the meat chunks are pork having a weight in the range of about 3 to about 8 pounds each.

3. The process of claim 1 wherein the gelatin has a Bloom strength of between about 200 and 350 and is present in an amount of between about 0.25 ounces and 2 ounces.